US011934150B2

(12) United States Patent
Di Domenico et al.

(10) Patent No.: US 11,934,150 B2
(45) Date of Patent: Mar. 19, 2024

(54) HOROLOGICAL MOVEMENT COMPRISING AN ESCAPEMENT PROVIDED WITH A TOOTHED WHEEL AND A STOPPER

(71) Applicant: The Swatch Group Research and Development Ltd, Marin (CH)

(72) Inventors: Gianni Di Domenico, Neuchatel (CH); Gérard Surmely, Villars-Epeney (CH); Marc Stranczl, Nyon (CH)

(73) Assignee: The Swatch Group Research and Development Ltd, Marin (CH)

( * ) Notice: Subject to any disclaimer, the term of this patent is extended or adjusted under 35 U.S.C. 154(b) by 383 days.

(21) Appl. No.: 17/221,429

(22) Filed: Apr. 2, 2021

(65) Prior Publication Data

US 2021/0356911 A1 Nov. 18, 2021

(30) Foreign Application Priority Data

May 13, 2020 (EP) .................................... 20174394

(51) Int. Cl.
*G04B 15/14* (2006.01)
*G04B 15/08* (2006.01)
*G04B 17/30* (2006.01)

(52) U.S. Cl.
CPC ............. *G04B 15/14* (2013.01); *G04B 15/08* (2013.01); *G04B 17/30* (2013.01)

(58) Field of Classification Search
CPC ................................ G04B 15/10; G04B 15/14
See application file for complete search history.

(56) References Cited

U.S. PATENT DOCUMENTS

| | | | |
|---|---|---|---|
| 2,717,488 A | 9/1955 | Linard | |
| 2020/0089168 A1 | 3/2020 | Di Domenico et al. | |

FOREIGN PATENT DOCUMENTS

| | | | |
|---|---|---|---|
| CH | 703449 A2 * | 1/2012 | G04B 15/08 |
| CN | 1427316 A * | 7/2003 | G04B 15/10 |

(Continued)

OTHER PUBLICATIONS

Combined Chinese Office Action and Search Report dated May 23, 2022, in Chinese Patent Application No. 202110527234.1 (with English translation), 12 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A horological movement includes a resonator and an escapement wheel with flexible teeth, and an anchor formed of two mechanical pallets capable of abutting, when the anchor switches between its two rest positions, with any one of the flexible teeth depending on the angular position of the escapement wheel. Each flexible tooth is arranged to bend by undergoing an elastic deformation under a radial force that can be exerted by one of the two mechanical pallets abutting against this flexible tooth while the escapement wheel has an unfavourable angular position and the resonator is braked by the anchor. Each tooth has an elastic capacity to elastically absorb, in a radial direction, most of a maximum mechanical energy that the mechanical resonator may have during normal operation of the horological movement, to avoid breakage or deterioration of the escapement.

12 Claims, 4 Drawing Sheets

(56) References Cited

FOREIGN PATENT DOCUMENTS

| | | | | |
|---|---|---|---|---|
| CN | 110928170 | A | 3/2020 | |
| EP | 2 801 868 | A2 | 11/2014 | |
| EP | 2801868 | A2 * | 11/2014 | ........... G04B 13/027 |
| EP | 3037894 | A1 * | 6/2016 | ............. G04B 15/10 |
| EP | 3182224 | A1 * | 6/2017 | ............. G04B 15/10 |
| EP | 3217227 | A1 * | 9/2017 | ............... G04B 1/22 |
| EP | 3 627 242 | A1 | 3/2020 | |
| FR | 1.047.551 | A | 12/1953 | |
| GB | 505059 | A | 5/1939 | |

OTHER PUBLICATIONS

European Search Report dated Oct. 14, 2020 in European Application 20174394.5 filed May 13, 2020 (with English Translation of Categories of Cited Documents), 3 pages.

* cited by examiner

HOROLOGICAL MOVEMENT COMPRISING AN ESCAPEMENT PROVIDED WITH A TOOTHED WHEEL AND A STOPPER

CROSS-REFERENCE TO RELATED APPLICATION

This application claims priority to European Patent Application No. 20174394.5 filed on May 13, 2020, the entire disclosure of which is hereby incorporated herein by reference.

TECHNICAL FIELD

The invention relates to horological movements comprising an escapement provided with a stopper cooperating, on the one hand, with a toothed escapement wheel and, on the other hand, with a mechanical resonator.

In particular, the invention relates to a horological movement provided with an escapement comprising a magnetic coupling system between a toothed escapement wheel and an anchor. As in the case of a Swiss anchor, the anchor has a reciprocating movement which is synchronous, but different from the periodic movement of the mechanical resonator, this anchor being arranged so as to periodically stop the escapement wheel so that the latter has a step-by-step rotation which is clocked by the mechanical resonator. "Magnetic escapement" means an escapement provided with magnets arranged partly on the anchor and partly on the escapement wheel so as to generate a magnetic coupling between the anchor and the escapement wheel.

TECHNOLOGICAL BACKGROUND

The Swiss anchor escapement has been known for a very long time.

In normal operation, the teeth of the escapement wheel cooperate with two pallets of the anchor in a determined manner allowing step-by-step rotation of the escapement wheel which is synchronous with the oscillation of the mechanical resonator, namely in general a balance spring. When the force torque supplied to the escapement wheel decreases as the barrel spring relaxes, the sustaining pulses generated by the escapement and transmitted to the resonator gradually decrease in intensity so that when the wheel ends up stopping while said force torque falls below a limit value, the energy stored in the resonator is relatively low. Thus, the risk of a pallet or a tooth of the escapement wheel being damaged during a possible terminal impact between a pallet and a tooth, depending on the angular stop position of the escapement wheel, is relatively low although not excluded. The situation is more problematic in the case of a horological movement provided with a constant force drive system for the escapement wheel, because the resonator retains substantially the same mechanical energy throughout the operation of the escapement until the escapement wheel and its drive are stopped. The risk of an accidental event at the end of the horological movement is therefore increased.

Document FR 1 047 551, in particular on page 4 in the second and third complete paragraphs on this page, and document U.S. Pat. No. 2,717,488, in particular in lines 39 to 61 of column 4, describe a timepiece escapement comprising an escapement wheel provided with teeth having an elasticity in the tangential direction, but with good rigidity in the radial direction, in order to be able to damp the tangential impacts occurring between the teeth of the escapement wheel and the two pallets of the anchor during normal operation of the escapement. In order to be able to reduce the variation in the pulses supplied to the anchor by the escapement wheel, patent application EP 2 801 868 A2 proposes an escapement wheel provided with teeth mounted on flexible blades oriented radially, so that these blades can easily be deformed under the action of a tangential force. Abutments formed by the configuration of the escapement wheel in the general plane of the teeth are provided to limit such tangential deformation and also rotation of the teeth.

SUMMARY OF THE INVENTION

In the context of the development which led to the invention, it has been observed that the problem indicated above becomes a major drawback in the case of a horological movement comprising a hybrid, magnetic and mechanical escapement. Indeed, it has been observed that the risk of a terminal impact between the anchor and the escapement wheel increases sharply in the case of a hybrid escapement, namely an escapement provided with a magnetic coupling system between the anchor and the escapement wheel, with magnetic potential energy ramps allowing the accumulation of potential magnetic energy in the escapement with each step of the step-by-step rotation of the escapement wheel before generating a magnetic pulse at the end of the step, while this escapement wheel is stopped. The escapement wheel of the hybrid escapement comprises projecting parts intended to cooperate with the mechanical pallets of the anchor in at least one phase of the operation of the escapement (for example at start-up and more particularly during normal operation of the horological movement, to absorb kinetic energy at each step of the escapement wheel and define angular stop positions for the escapement wheel, as will be explained in the detailed description of the invention). Indeed, the hybrid escapement has the risk of the escapement wheel stopping in an unfavourable angular position while the mechanical resonator still has nominal mechanical energy. First, sustaining pulses are magnetic pulses having a constant value as long as the force torque supplied to the escapement wheel is greater than or equal to a certain lower limit. Then, as soon as the force torque is below this lower limit, the escapement wheel can no longer properly climb the next magnetic potential energy ramp, so that the escapement wheel will not stop in a next normal angular stop position, but substantially at the bottom of or along a magnetic potential energy ramp. Therefore, as the mechanical resonator oscillates normally during such an event since it has previously received magnetic pulses of substantially constant intensity (nominal intensity), if a mechanical pallet appears in front of a tooth during the next switching of the anchor, a strong impact may occur and damage the escapement wheel or the anchor, or even the mechanical resonator. This increased technical problem therefore requires an appropriate technical solution.

To this end, the invention relates to a horological movement comprising a mechanical resonator and an escapement which is associated with this mechanical resonator, the escapement comprising an escapement wheel, provided with a plurality of projecting parts, and a stopper comprising two mechanical pallets, forming two mechanical abutments for the plurality of projecting parts, and a fork arranged to cooperate with the mechanical resonator via a periodic engagement of a pin, integral with this mechanical resonator, between two horns of the fork. The mechanical resonator is coupled to the stopper so that, during normal operation of the horological movement, the stopper undergoes a reciprocating movement between two rest positions wherein this stopper alternately remains during successive time intervals. The escapement is arranged so as to allow, during normal operation of the horological movement, absorption of kinetic energy of the escapement wheel by successive impacts, between the plurality of projecting parts and alternately the two mechanical pallets, respectively at the end of successive steps of a step-by-step rotation of the escapement wheel. According to the invention, the escapement is arranged so that, when the stopper is switched from a first of its two rest positions towards the second rest position, while the escapement wheel has any angular position in a plurality of ranges of angular positions corresponding respectively to the plurality of projecting parts, one of the two mechanical pallets abuts against a projecting part corresponding to the concerned range of angular positions before the stopper can reach an angular position of disengagement of the pin on the side of the second rest position, said one of the two mechanical pallets then exerting on said projecting part a radial force, relative to the axis of rotation of the escapement wheel, the intensity of which depends on said any angular position of the escapement wheel. Then, the projecting parts of the escapement wheel are flexible and each is arranged so as to be able to bend, in a general plane perpendicular to an axis of rotation of the stopper, undergoing a radial elastic deformation under the action of said radial force, each projecting part having an elastic capacity allowing to elastically absorb, during said elastic deformation, most of a maximum mechanical energy that the mechanical resonator can have during normal operation of the horological movement.

In the general embodiment explained above, the flexible projecting parts are configured and the elasticity coefficients of these flexible projecting parts are selected so as to allow good elastic absorption of the mechanical energy of the mechanical resonator in the case of stopping the escapement wheel in an angular position of the range of angular positions corresponding to the concerned projecting part, while the mechanical resonator oscillates with an amplitude corresponding to a normal operation of the horological movement, and so as to allow a good non-elastic absorption of the kinetic energy of the escapement wheel at the end of each step of its step-by-step rotation during normal operation. It will be noted that it is possible to have, in particular for two main reasons, these two properties of different natures thanks to a judicious configuration of the projecting parts and the choice of elasticity coefficients/elastic deformation capacities, in the radial and angular directions, which are appropriate for the two functions to be performed by the flexible projecting parts. First, the mechanical energy of the mechanical resonator in normal operation is much greater than the kinetic energy of the escapement wheel at the end of each of its steps during the step-by-step rotation of this wheel. The energy ranges involved in these two cases are not of the same order of magnitude. Then, the impact between a mechanical pallet and a projecting part generates, in normal operation, on this projecting part a tangential force, relative to the axis of rotation of the escapement wheel, while the impact between a mechanical pallet and this projecting part, when stopping the escapement wheel in the range of angular positions corresponding to the considered projecting part, generates on this projecting part generally a mainly radial force.

In a preferred embodiment of the invention, a plurality of rigid parts, integral with the escapement wheel, are respectively arranged behind the plurality of flexible projecting parts, relative to the normal direction of the step-by-step rotation of the escapement wheel, so that each flexible projecting part is retained by the corresponding rigid part during an impact, among the successive impacts mentioned above, occurring between this projecting part and either one of the two mechanical pallets, to prevent or limit a recoil of this flexible projecting part during this impact and allow dissipation of most of the kinetic energy that the escapement wheel has at the beginning of this impact. 'Recoil of a projecting part' means an angular displacement of the projecting part in the direction opposite to that of the normal rotation of the escapement wheel. Then, the arrangement of the plurality of rigid parts is provided such that when a mechanical pallet abuts against a flexible projecting part and the mechanical resonator is then braked by the stopper, each flexible projecting part subjected to the radial force mentioned above can elastically deform so as to elastically absorb most of the work of this radial force.

In a particular embodiment, the escapement or a mechanism for driving the escapement wheel is arranged so that, during normal operation of the horological movement, the escapement wheel supplies pulses to the stopper for sustaining an oscillation of the mechanical resonator which have a substantially constant energy as long as the horological movement is operating normally.

In a main embodiment, the escapement comprises a magnetic system magnetically coupling the escapement wheel and the stopper, this magnetic system being arranged so as to generate, during normal operation of the horological movement, magnetic pulses which form the constant energy sustaining pulses mentioned above.

In an advantageous embodiment, the stopper also has an elastic capacity allowing it to elastically absorb, when one of the two mechanical pallets abuts against a projecting part while the escapement wheel has an angular position inside the corresponding range of angular positions and the mechanical resonator is braked by the stopper, part of a mechanical energy that the mechanical resonator has at the beginning of such an event. In this case, the anchor and the concerned projecting part together advantageously have an elastic capacity allowing them to elastically absorb during said event a maximum mechanical energy that the mechanical resonator can have during normal operation of the horological movement.

BRIEF DESCRIPTION OF THE FIGURES

The invention will be described in more detail below using the appended drawings, given by way of non-limiting examples, wherein.

DETAILED DESCRIPTION OF THE INVENTION

Figure 1A:
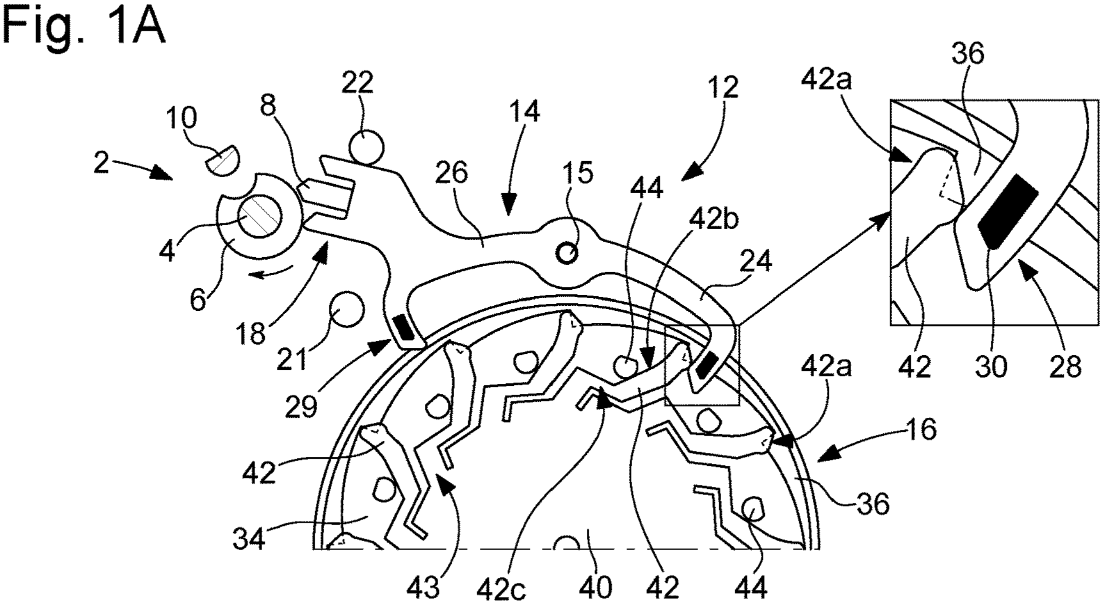
FIGS. 1A to 1D show, for a mechanical horological movement according to a preferred embodiment of the invention, a succession of snapshots of the mechanical resonator and of the escapement during normal operation of the horological movement.

Using the appended figures, a preferred embodiment of a horological movement according to the invention will be described below, which is of the mechanical type and comprises a mechanical resonator 2, of which only the axis 4, the small plate 6 having a notch and the pin 10 were shown. The horological movement comprises an escapement 12 which is associated with the mechanical resonator, the small plate and the pin of which are elements forming this escapement. The escapement 12 further comprises an escapement wheel 16 and an anchor 14 provided with an axis 15 defining its axis of rotation.

The anchor 14 is formed, on the one hand, of a fork 18, comprising two horns 19*a* and 19*b*, and of a dart 8 and, on the other hand, of two arms 24 and 26, the free ends of which respectively form two mechanical pallets 28 and 29. A connecting part 25 connects the fork 18 to the arm 26 which is located on the side of the axis 4 of the mechanical resonator 2 relative to the axis 15 of the anchor. The two mechanical pallets respectively support two magnets 30 and 32 which form two magnetic pallets of the anchor 14. The mechanical resonator 2 is coupled to the anchor so that, when the mechanical resonator oscillates normally, this anchor undergoes a reciprocating movement, synchronised with the oscillation of the mechanical resonator, between two rest positions, defined by two limiting pegs 21 and 22, wherein the anchor alternately remains during successive time intervals.

The escapement wheel 16 comprises a periodic magnetised structure 36 which is arranged on a disc 34, preferably made of non-magnetic material (not conducting magnetic fields so as not to make the escapement wheel sensitive to external magnetic fields which could exert a significant torque on this escapement wheel if this disc was made of a ferromagnetic material). The structure 36 has magnetised portions 38, which are generally circular-arc shaped, which define increasing ramps of magnetic potential energy for the two magnetic pallets 30 and 32, which each have an axial magnetisation with a polarity opposite to that of the axial magnetisation of the periodic magnetised structure 36 so as to generate magnetic repulsion between the magnetic pallets and the magnetised structure. Each magnetised portion has an increasing monotonic width. In particular, the width of the magnetised portions 38 increases, over their entire useful length, linearly depending on the angle at the centre. According to an advantageous variant, the periodic magnetised structure 36 is arranged so that its outer periphery is circular, the circular-arc shaped magnetised portions of this magnetised structure having the same configuration and being arranged circularly around the axis of rotation of the escapement wheel 16.

In general, each increasing ramp of magnetic potential energy is provided so that each of the two magnetic pallets can climb it when the anchor is in a given rest position, among its two rest positions, and that a force torque supplied to the escapement wheel is substantially equal to a nominal force torque (case of a mechanical movement provided with a constant force system for driving the escapement wheel) or comprised in a range of values intended to ensure the normal operation of the horological movement (case of a conventional mechanical movement having a variable force torque applied to the escapement wheel depending on the level of winding of the barrel(s)). The increasing ramps of magnetic potential energy are climbed, when the anchor undergoes a reciprocating movement between its two rest positions and when the force torque supplied to the escapement wheel is equal to said nominal force torque or comprised within the range of values provided for this force torque in normal operation, successively by each of the first and second magnetic pallets while the anchor is periodically and respectively in its first and second rest positions, and alternately by these first and second magnetic pallets during the reciprocating movement of the anchor. The two magnetic pallets and the increasing ramps of magnetic potential energy are arranged so that the anchor can undergo a pulse of magnetic force in the direction of its movement, after either one of the two magnetic pallets has climbed any one of said increasing ramps of magnetic potential energy, when the anchor switches from the rest position corresponding to a magnetic coupling between the concerned magnetic pallet and said any magnetic potential energy ramp to its other rest position.

The escapement wheel further comprises projecting parts 42 which are associated respectively with the magnetised portions 38 and therefore with the increasing ramps of magnetic potential energy. These projecting parts are formed, in the variant shown, by flexible teeth 42 extending at the periphery of a plate 40 with which the teeth are integral, this plate being integral with the escapement wheel and located above the disc 34 which carries the magnetised structure 36. The heads of the flexible teeth are located respectively at the widest end of the magnetised portions 38 and are partially superimposed on these magnetised portions. Flexible teeth and mechanical pallets are formed by a non-magnetic material. Preferably, the plate 40 is also formed by a non-magnetic material and it is integrally formed with the teeth.

In the advantageous variant shown, the teeth 42 extend in a general plane wherein the two mechanical pallets 28, 29 of the anchor also extend. The two magnets 30, 32 are respectively supported by the two mechanical pallets and are also located in said general plane. The figures only show a lower magnetised structure, located below the general plane. However, in an advantageous variant, the escapement wheel further comprises an upper magnetised structure, of the same configuration as the lower magnetised structure and supported by an upper disc, preferably formed of a non-magnetic material. The lower and upper magnetised structures together form the periodic magnetised structure. They have the same magnetic polarity, opposite to that of the two anchor magnets, and are arranged on either side of the geometric plane wherein these two magnets forming the two magnetic pallets are located, preferably at the same distance.

The escapement 12 is a hybrid-type escapement, that is to say magnetic and mechanical escapement, which allows to improve the behaviour of a magnetic escapement in normal operation (that is to say during stable operation, occurring after a start-up phase, with a force torque $M_{RE}$ supplied to the escapement wheel which is substantially equal to a nominal force torque or within a range of values $P_{VM}$ intended to ensure the normal operation of the horological movement, in particular correct step-by-step rotation of the escapement wheel). In addition, the escapement 12 allows to obtain a self-starting of the assembly formed of the escapement and the mechanical resonator. The role of the teeth 42 of the escapement 12 during normal operation of the horological movement will be explained below, in particular using FIGS. 1A to 1C, and then the self-starting phase will be explained using FIGS. 2A and 2B.

In general, the escapement 12 is arranged so as to allow, during normal operation of the horological movement, absorption of kinetic energy of the escapement wheel by successive impacts, between the plurality of projecting parts 42 and alternately the two mechanical pallets 28, 29, respectively at the end of successive steps of a step-by-step rotation of the escapement wheel. The anchor 14 and the escapement wheel 16 are arranged such that, in normal operation, one of the teeth 42 of the escapement wheel undergoes at least one impact on either one of the two mechanical pallets after the corresponding magnetic pallet has climbed any one of the increasing ramps of magnetic potential energy following a switching of the anchor. This impact occurs so as to at least partially dissipate kinetic energy of the escapement wheel gained following said switching. The teeth of the escapement wheel are therefore designed to be able, during normal operation of the horological movement, to absorb the kinetic energy of this escapement wheel, at each step of the escapement wheel, in a non-elastic manner, after an accumulation of magnetic potential energy in the escapement provided for a next sustaining magnetic pulse of the mechanical resonator, and thus to limit or even prevent a terminal oscillation of the escapement wheel, thanks to the high damping provided, during each step of its step-by-step rotation.

In the preferred variant described, in normal operation and once the escapement wheel momentarily stopped, a flexible tooth 42 presses against a mechanical abutment/a stop surface of the anchor formed by either one of the two mechanical pallets. Thus, for a conventional horological movement, it is expected, in normal operation and for the entire range of values $P_{VM}$ of the force torque $M_{RE}$, that the escapement wheel becomes momentarily stationary, after at least a first impact of any one of its teeth against any one of the two mechanical pallets 28, 29 and before a subsequent switching of the anchor, at an angular stop position wherein the any tooth presses against the any mechanical pallet. Each angular stop position is thus defined by a tooth bearing against a mechanical pallet, as shown in FIG. 1A.

For the function of the flexible teeth 42, in normal operation, to be carried out efficiently, it is important that these teeth have a relatively high rigidity during the tangential impacts of their respective heads against the mechanical pallets while the escapement wheel is driven step by step in its normal direction of rotation. Thus, it is expected that the desired rigidity is seen for a relatively large tangential force, exerted by a mechanical pallet on the head of any flexible tooth, having a direction opposite to the normal direction of rotation of the escapement wheel. To this end, a plurality of rigid parts, formed in particular by pegs 44 fixed to the disc 34 and rising therefrom in the direction of a general plane wherein the flexible teeth 42 extend, are respectively arranged at the rear of the plurality of flexible teeth, so as to neutralise or inhibit most of the flexibility of these teeth during successive impacts, provided in normal operation, to absorb kinetic energy of the escapement wheel at the end of each step of its step-by-step rotation and to limit or even prevent an oscillation of the escapement wheel following an accumulation of magnetic potential energy preceding a first impact between a mechanical pallet and a tooth at the end of each step.

In general, the plurality of rigid parts (retaining pegs 44), integral with the escapement wheel 16, are respectively arranged behind the plurality of flexible projecting parts (flexible teeth 42), relative to the normal direction of step-by-step rotation of the escapement wheel. The configuration of the flexible teeth 42 and the retaining pegs 44 is provided so that each peg substantially blocks any movement of the corresponding tooth in a tangential direction and in a direction opposite to that of the normal rotation of the escapement wheel, so that each flexible tooth 42 is retained by the corresponding peg during an impact occurring, in normal operation, between this flexible tooth and either one of the two mechanical pallets of the anchor, to prevent or greatly limit a recoil of this flexible tooth during this impact and allow dissipation of most of the kinetic energy that the escapement wheel has at the beginning of this impact.

In the specific variant shown in the figures, the flexible teeth 42 have a particular configuration with a head 42*a*, a nose of which in turn abuts, in normal operation, against one and, subsequently, the other of the two mechanical pallets of the anchor, a rigid or semi-rigid body 42*b* and an end part 42*c* which is formed by a flexible blade oriented mainly tangentially relative to the centre of the escapement wheel, more particularly substantially parallel to the direction tangential to the end of the nose of the considered flexible tooth, this end defining the point of impact with each mechanical pallet during normal operation of the horological movement. The end part of each tooth is fixed to a base 43 projecting from the plate 40 and having an orientation substantially perpendicular to this end part, the base being according to the rigid or semi-rigid variant. 'Semi-rigid' means a rigidity much greater than that of the flexible blade in its transverse direction in the general plane of the flexible tooth, and therefore less elasticity without having a rigidity practically excluding any elastic deformation during an impact.

It will be noted that the configuration of the flexible teeth 42 provided in the aforementioned specific variant is also advantageous and adapted for the general embodiment described above in the summary of the invention. Indeed, the flexible teeth have a relatively high elasticity in the radial direction at the top of their head (in the case of a frontal impact between a pallet and the top of a tooth head when the horological movement stops operating normally, situation which will be described in more detail hereinafter with reference to FIGS. 3A to 3F), but a relatively small elasticity in the tangential direction at the end of their nose (for a non-elastic absorption of kinetic energy of the escapement wheel during the successive impacts provided with the mechanical pallets during normal operation of the horological movement), because the end part 42*c* is at least semi-rigid in the longitudinal direction of the flexible blade which forms this end part. However, as the nose of each tooth is radially distant from the end part of this tooth, a tangential impact at the nose of a tooth generates a certain force torque on the tooth relative to the anchoring point of its end part at the base 43, in the opposite direction to that of the rotation of the escapement wheel, since the normal to the point of impact on the contact surface of each mechanical pallet passes widely above the end part, in a system of polar coordinates centred on the escapement wheel, so that the end part 42*c* then reacts like an elastic joint, in particular in rotation around its anchoring point at the base 43, and the head of the tooth can undergo a recoil movement, with an elastic deformation of the end part, which is a drawback remaining in the general embodiment for the normal operation of the horological movement. The preferred embodiment described with reference to the figures overcomes this specific problem and allows to optimise the operation of the hybrid escapement.

In the preferred embodiment, in the variant shown in the figures, retaining pegs 44 are arranged behind the bodies 42*b* of the flexible teeth, at a short distance from these tooth bodies or bearing against them. Since the elasticity of each flexible tooth is mainly integrated into its end part 42*c* and since the flexible blade which forms it is expected to be oriented mainly tangentially relative to the point of contact between the flexible tooth and the retaining peg, this tooth has as desired a relatively high rigidity upon impact between its nose and either one of the two mechanical pallets in normal operation (as indicated, the flexible blade which forms the end part of the tooth has a relatively strong elasticity in the direction transverse to this blade, but relatively high rigidity in its longitudinal direction). Each retaining peg 44 has at least two functions in normal operation of the horological movement, namely a first function consisting in blocking the elastic joint formed by the flexible end part 42*c* of the corresponding flexible tooth to obtain a relatively high rigidity of this tooth upon tangential impact at the end of said nose of its head, the second function being to participate in a non-elastic absorption of the kinetic energy of the escapement wheel during such a tangential impact.

Figure 1B:
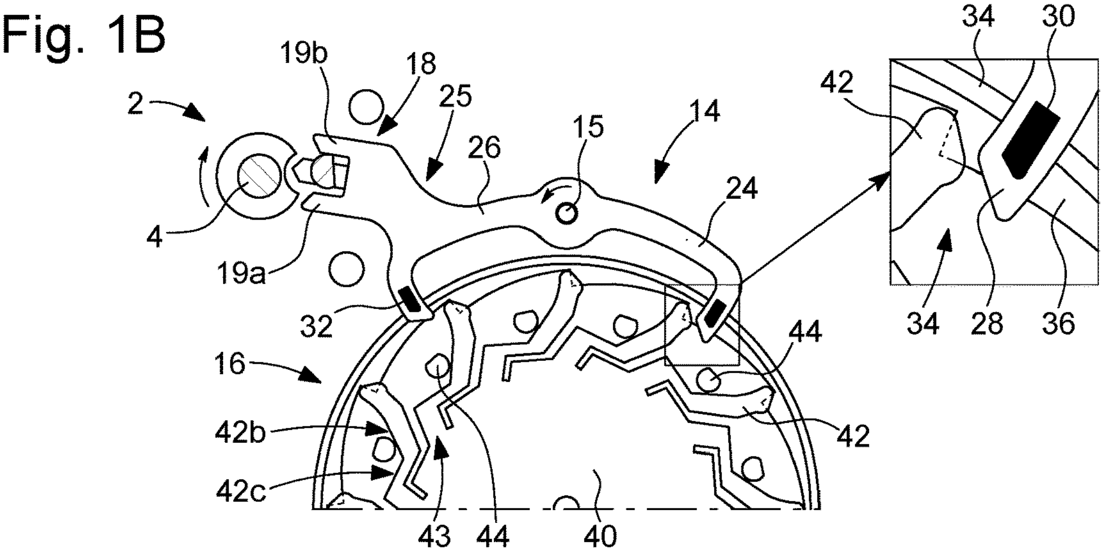

FIGS. 1A to 1D show four snapshots of the assembly formed by the mechanical resonator 2 and the hybrid escapement 12 during normal operation of the horological movement incorporating this assembly. In FIG. 1A, while the mechanical resonator 2 oscillates in its free angular range, that is to say without interaction with the fork 18 of the anchor 12, the latter is in a first of its two rest positions bearing against the limiting peg 22. Then, the escapement wheel 16 is in an angular end-of-step position wherein it is stopped by the mechanical pallet 28 against which the nose of the head 42*a* of a flexible tooth 42 abuts, the body 42*b* of this flexible tooth being retained by a peg 44 arranged upstream of the tooth, or behind the body 42*b*. The flexible tooth undergoes almost no elastic deformation in this situation. FIG. 1B shows the aforementioned assembly as the pin 10 of the mechanical resonator is engaged in the fork/inserted between the two horns 19*a* and 19*b* thereof, just after the peg has slightly angularly displaced the anchor 14 so as to displace the magnet 30 sufficiently in a radial direction to allow this anchor to switch between its two rest positions by generating a magnetic pulse which then generates a force torque on the anchor, which becomes a driver for the mechanical resonator 2, as shown, and provides it with a sustaining pulse without requiring an angular displacement of the escapement wheel during this event.

Figure 1C:
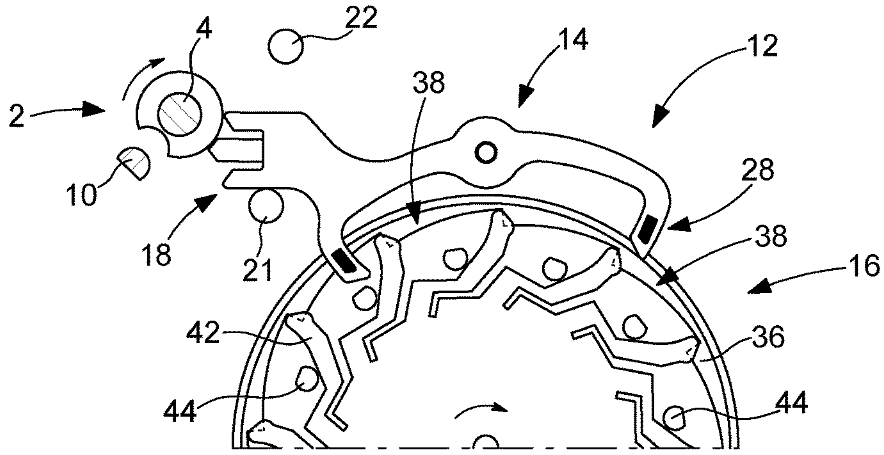
Figure 1D:
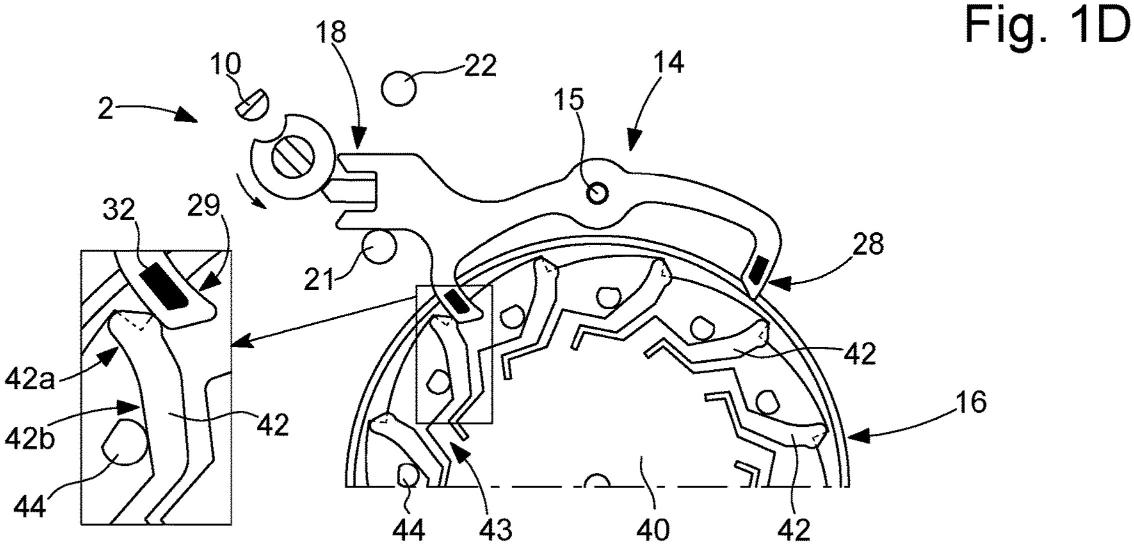

FIG. 1C shows the considered assembly while the switching of the anchor 14 has ended and the mechanical resonator is again released from the anchor which is then in its second rest position. The magnet 32 associated with the mechanical pallet 29 begins to climb a magnetic potential energy ramp formed by a magnetised portion 38 defining an increasing ramp for the magnet 32 while the escapement wheel is rotated by the motor means of the horological movement. FIG. 1D shows a tangential impact occurring between a flexible tooth 42 and the mechanical pallet 29 while the magnet 32 has reached the top of the expected magnetic potential energy ramp. This tangential impact and the reaction of the assembly formed by the concerned tooth 42 and the retaining peg 44 which is associated therewith were explained in detail previously. It follows from the arrangement of this assembly that the flexible tooth 42 remains substantially rigid during such an impact and undergoes almost no elastic deformation while the escapement wheel, in particular via the peg 44, and the anchor 14 absorb most of the kinetic energy that the escapement wheel has during the tangential impact.

Then, the flexible teeth 42 and the mechanical pallets 28, 29 are arranged so that, during a new winding of the barrel spring following a stop of the horological movement and allowing the escapement wheel 16 to rotate in the intended direction of rotation, at least one of the two mechanical pallets 28, 29 contacts a tooth 42 of the escapement wheel, which are configured so that the escapement wheel can supply the anchor 14 with a start-up mechanical force torque and therefore a start-up mechanical pulse. Thus, efficient and rapid self-starting of the assembly formed of the escapement 12 and the mechanical resonator 2, and therefore of the mechanical horological movement, is made possible. The escapement wheel subjected to said start-up torque is not stopped by the contact between the concerned flexible tooth and mechanical pallet, and the flexible tooth is arranged in association with the retaining peg 44 so as to be able to at least partially transmit said start-up torque to the anchor.

In the variant shown in the figures, each of the flexible teeth 42 has, in a polar coordinate system which is centred on the axis of rotation of the escapement wheel 16, a first inclined surface SI1 which is inclined so that each of the first and second mechanical pallets 28, 29 can, in a start-up phase, slide on this first inclined surface while the escapement wheel passes through a corresponding range of angular positions θ. ‘Inclined surface’ in a polar coordinate system, means a surface which is neither radial nor tangential. In addition, each of the two mechanical pallets of the anchor has, in the polar coordinate system associated with the escapement wheel, a second inclined surface SI2 when the considered pallet is in contact with one of the teeth 42 of the escapement wheel. The second inclined surface is configured so that each of the teeth 42 can, in a start-up phase, slide on this second inclined surface when the escapement wheel passes through a range of angular positions A which corresponds to a contact area between the considered tooth and mechanical pallet.

For the start-up phase, it is sufficient that an oscillation of the mechanical resonator can be activated and with it the reciprocating movement of the anchor which then allows to sustain this oscillation by magnetic pulses. Thus, the fact that the flexible teeth may have a certain elastic deformation in a radial direction is not a crucial fact for the starting function, although this may decrease the efficiency of the intended start-up torque. To limit radial elastic deformation of the flexible tooth towards the centre of the escapement wheel, the flexible teeth, the retaining pegs and the mechanical pallets are arranged so that the reaction force exerted upon start-up by a mechanical pallet in contact with a flexible tooth, as the escapement wheel begins to rotate, has an overall orientation which passes, in the polar coordinate system of the escapement wheel, above the point of contact between the body 42*b* of the concerned tooth and the retaining pin located behind this tooth body. In particular depending on the inclination of the inclined surface of the mechanical pallet while a head 42*a* of a flexible tooth bears against it, a certain frictional force between this head and the inclined surface may be favourable. However, this frictional force must not be too great to allow the tooth to slide along this inclined surface to generate a start-up pulse.

Figure 2A:
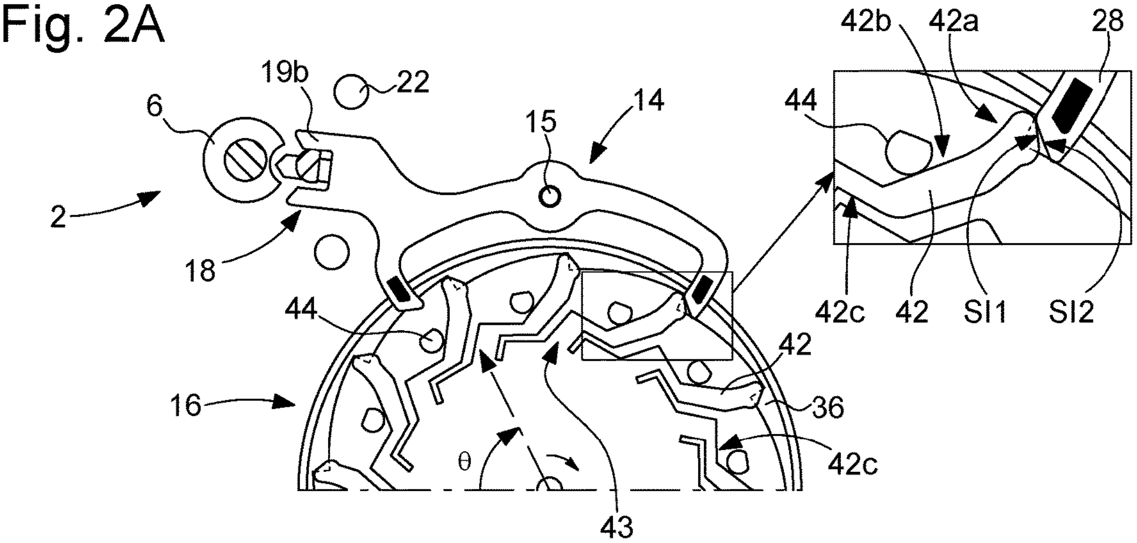
FIGS. 2A and 2B show a start-up phase of the horological movement, shown in the previous figures, during which the escapement and the mechanical resonator are activated.
Figure 2B:
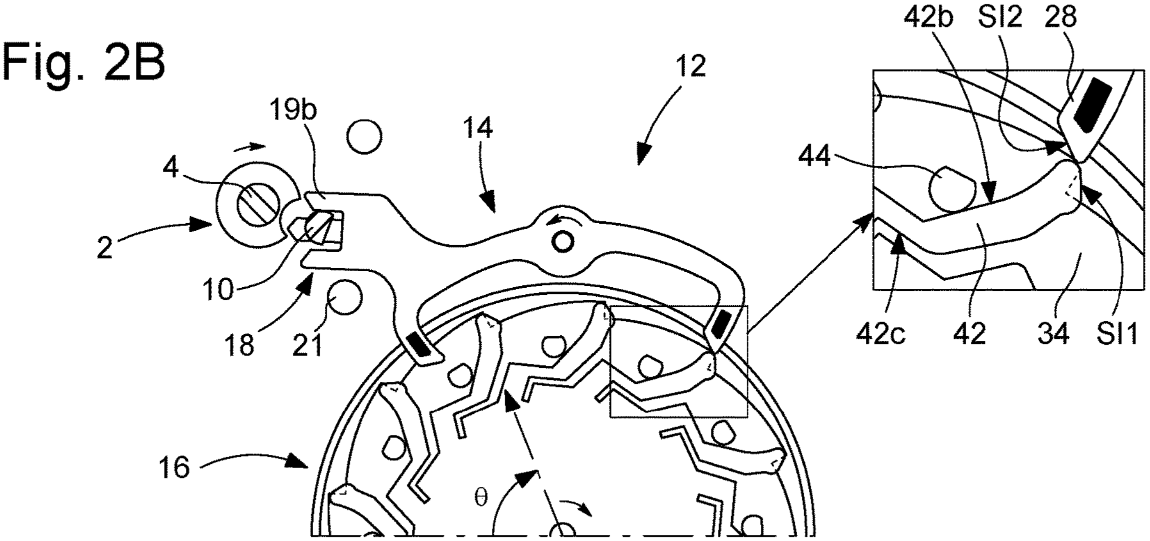

FIG. 2A shows the assembly formed of the escapement wheel 16, the anchor 14 and the mechanical resonator 2 initially stopped at the beginning of a start pulse. The horn 19*b* of the fork 18 begins to exert a start-up force on the pin 10 of the mechanical resonator. Then, the escapement wheel continues to rotate and the anchor undergoes a torque of mechanical force which is transmitted to the mechanical resonator via the coupling between the fork and the pin until a situation as shown in FIG. 2B wherein the mechanical resonator received a start-up mechanical pulse, possibly reinforced by a certain simultaneous magnetic pulse; which starts an oscillation of this mechanical resonator.

Figure 3A:
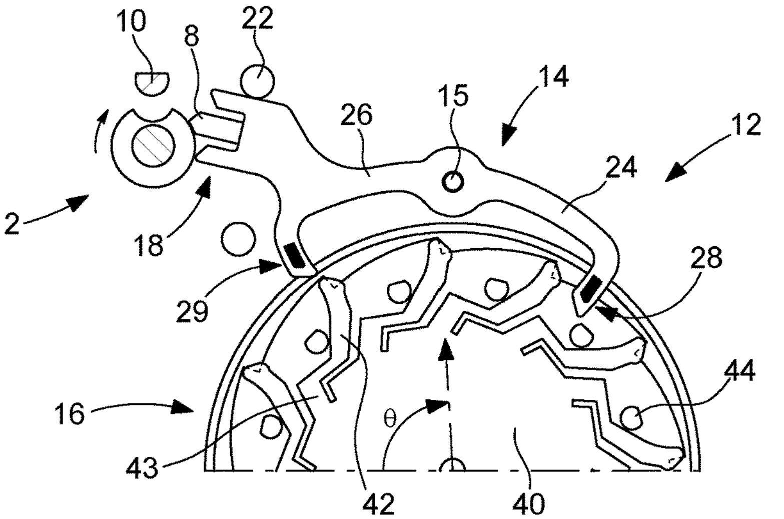
FIGS. 3A to 3F show a succession of snapshots of the mechanical resonator and of the escapement during a stop phase of the horological movement, shown in the previous figures, following a stopping of the escapement wheel in an unfavourable angular position.
Figure 3B:
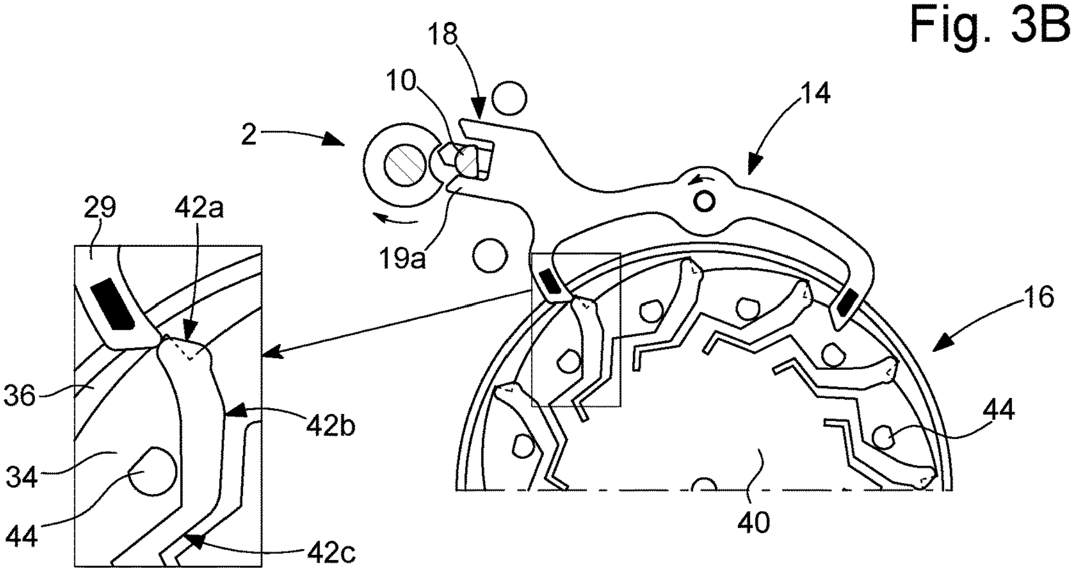

The incorporation of teeth 42 to allow either one of the two functions described above, namely the damping of oscillations of the escapement wheel during a step-by-step rotation of the latter in normal operation and a self-starting of the assembly formed by the mechanical resonator and the escapement, in particular an escapement of the magnetic type, has the consequence that, during a switching of the anchor 14 from a first of its two rest positions in the direction of the second rest position while the escapement wheel 16 is positioned in any angular position A from a plurality of ranges of angular positions corresponding respectively to the plurality of teeth, one of the two mechanical pallets abuts against one of these teeth before the anchor can reach the angular position of disengagement of the pin on the side of the second rest position, as shown in FIG. 3B. ‘Angular disengagement position’ for the pin of the mechanical resonator, in particular a balance spring, means the angular position (on either side of a median position defining a zero angular position for the anchor) from which the pin can be disengaged, for one reason or another, from the fork, that is to say leaving the cavity formed by the two horns 19*a* and 19*b* without abutting against one of these horns to bring the anchor precisely until this disengagement position which occurs before the anchor reaches either one of its two rest positions. It will be noted that this last fact results from a usual safety angle provided to ensure that the pin can correctly leave the fork without undergoing an impact or terminal friction which would cause it to lose energy at each alternation and would disturb the oscillation of the mechanical resonator.

When the barrel spring relaxes, there comes a point when the horological movement ceases to function normally given that the force torque which the barrel can provide to the gear train and the escapement wheel becomes insufficient to ensure such normal operation. At a certain moment, as shown in FIG. 3A, the escapement wheel 16 finally stops rotating and is immobilised in a certain angular position A, but the mechanical resonator 2 is at this moment still oscillating and may even have a substantially nominal and therefore relatively high mechanical energy, as is generally the case with an escapement 12 provided with the magnetic system described above. As mentioned in the previous paragraph, in particular in the case of an escapement 12 provided with the magnetic system for supplying magnetic sustaining pulses, the escapement wheel can stop in any angular position e from a plurality of ranges of angular positions, corresponding respectively to the plurality of flexible teeth 42, for which one of the two mechanical pallets then abuts against one of these teeth before the anchor can reach the angular position of disengagement of the pin, as shown in FIG. 3B. This FIG. 3B shows a particularly unfavourable case where part of the mechanical pallet 29 end undergoes an impact on the top of the head 42*a* of a flexible tooth 42 against which this mechanical pallet abuts. In such a case, the substantially radial force, in a polar coordinate system associated with the escapement wheel, exerted by the mechanical pallet of the anchor on the concerned flexible tooth is substantially perpendicular to the contact surface of the head 42*a* and the normal reaction force of the tooth is then substantially equal in intensity to the radial force, so that this tooth and the mechanical pallet are subjected to a frontal impact.

It will be noted that the frontal impact of substantially radial direction does not relate only to the instant at which the mechanical pallet and the tooth are contacted, but it is about a radial force pulse which has a certain duration given that this frontal impact takes place while the pin of the oscillating resonator is inserted between the two horns 19*a* and 19*b* of the fork 18 and a magnetic pulse is supplied to the anchor. During the aforementioned impact, the radial force pulse has several components:

first a component from the inertia of the moving anchor 14 which is stopped;—second a main component due to the mechanical energy stored in the oscillating mechanical resonator 2 which is stopped in its oscillation while its kinetic energy is almost maximum, via the coupling between the fork 18 and the pin 10;—third, a magnetic component resulting from the fact that the impact occurs while a magnetic pulse is supplied to the anchor. Thus, it is probable that, when the part of the mechanical pallet 29 end contacts the head 42*a* of a tooth while abutting against the top of this head, it is the anchor 14 which drives the mechanical resonator 2 by its horn 19*b* bearing against the pin 10, and only then, after a very short interval of time, this pin abuts against the horn 19*a* of the fork, as shown in FIG. 3B, and then undergoes a strong deceleration due the premature stopping of the anchor in its switching.

Figure 3C:
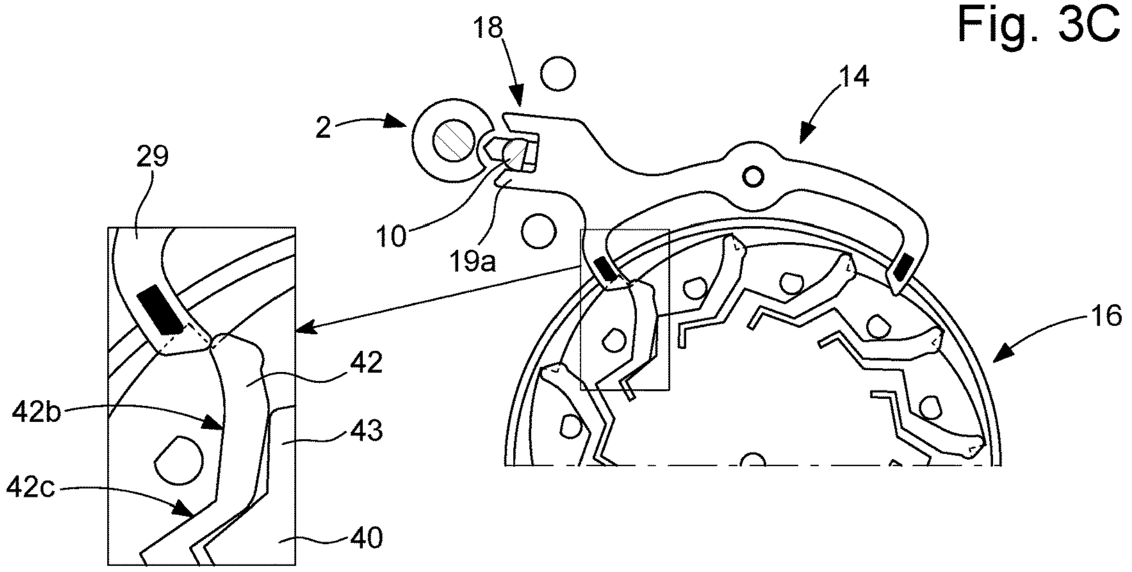
Figure 3D:
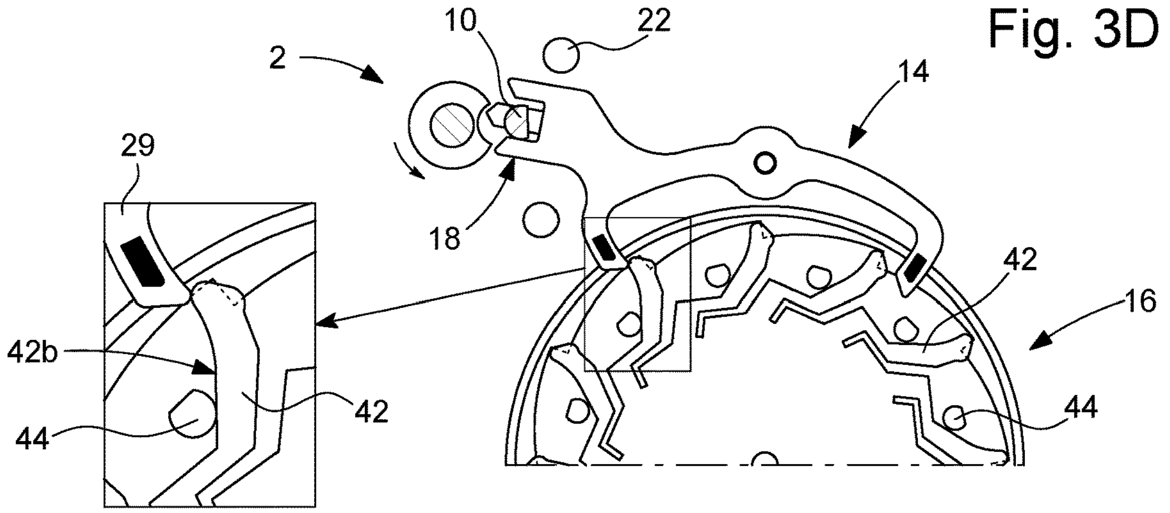

The more the braking of the mechanical resonator during the aforementioned impact is violent/has a strong intensity, the stronger the force exerted orthogonally on the horn 19*a* by the mechanical resonator, and by construction in a substantially tangential manner in a polar coordinate system associated with the anchor, and the reaction force of the anchor which brakes this mechanical resonator at the beginning of the impact. This poses a major problem, which is why the escapement wheel 16 is arranged and configured to be able to prevent breakage or deterioration of one of its parts, of the anchor or even of a part of the mechanical resonator during an event as shown in FIGS. 3B and 3C. In order to reduce the intensity of the force exerted by the pin of the resonator during said large impact and therefore to avoid too great instantaneous stress, a relatively long impact duration is provided with an elastic absorption of kinetic energy of the mechanical resonator 2 allowing the latter to decelerate over a certain angular distance and thus reduce the intensity of the deceleration.

To this end, the teeth 42 of the escapement wheel 16 are provided flexible and each is arranged so as to be able to bend, in a general plane perpendicular to an axis of rotation of the anchor 14, undergoing an elastic deformation under the action of a radial force, relative to the axis of rotation of the escapement wheel, which is exerted by one of the two mechanical pallets abutting against the considered flexible tooth while the escapement wheel has any angular position within a corresponding range of angular positions, mentioned above, and the mechanical resonator is braked by the anchor. Each flexible tooth has an elastic capacity allowing to elastically absorb, during said elastic deformation under the action of said radial force, most of the maximum mechanical energy that the mechanical resonator may have during normal operation of the horological movement. It will be noted that, during the impact between the mechanical pallet and the flexible tooth, there is a certain dissipation of energy, in particular in the mechanical resonator and the anchor, and also in other concerned structures, in particular in the plate 40 and the bearings of the escapement wheel. Thanks to the invention, any breakage or deterioration of the escapement and of the mechanical resonator can thus be avoided. It has already been explained previously that the flexible teeth 42 were configured so as to have mainly an elasticity in a radial direction passing through the top of their head 42*a*. Indeed, the end part 42*c* of each tooth having the greatest flexibility, and therefore the greatest elastic capacity, is formed by a flexible blade which is oriented mainly orthogonally to said radial direction.

‘Flexible tooth’, generally means a projecting element of which at least a part and/or a part for connecting this element to a support can deform elastically during an impact, which is in particular substantially radial, that this element can undergo under the action of a mechanical pallet of the anchor, having an elastic capacity sufficient to elastically absorb a significant part of the mechanical energy of the mechanical resonator that the anchor can transmit to this element while the mechanical resonator, initially having a mechanical energy corresponding to a normal operation of the horological movement, is close to its rest position and suddenly braked, in particular to zero speed, by the anchor, a mechanical pallet of which abuts against the projecting element. 'Elastic capacity' means an elastic energy absorbing capacity, the elastic energy being the energy stored in a stressed material in the form of elastic deformation. Thanks to the features of the escapement wheel according to the invention, an excessively sudden impact between the latter and the anchor is avoided and a progressive dissipation of the mechanical energy of the mechanical resonator when the escapement wheel stops is allowed, therefore regardless of its angular position.

In FIG. 3C, it is observed that, during the elastic deformation of a flexible tooth 42 under the action of a radial force due to a frontal impact of substantially radial direction, the tooth undergoes a significant force torque, in the direction of normal rotation of the escapement wheel, and it undergoes some rotation towards the centre of the escapement wheel as the end part 42*c* bends until the tooth abuts against the perimeter of the plate 40 and/or the base 43 of the tooth located in front of it. The bending of the tooth is therefore limited by a corresponding abutment comprised in the escapement wheel. It is also observed that the peg 44 associated with the tooth which is subjected to said radial force is arranged so that the body 42*b* of this tooth moves away from this peg during the bending of the tooth. Generally, the plurality of rigid parts (namely the pegs 44 in the variant shown) are arranged so that when a mechanical pallet abuts against a flexible projecting part (namely a flexible tooth 42 in the variant shown) and the mechanical resonator 2 is then braked by the anchor 14, the flexible projecting part subjected to said radial force can elastically deform so as to elastically absorb most of the work of that radial force. The rigid parts used as retaining elements for the flexible teeth, and located in particular behind the bodies of these flexible teeth, in no way interfere with the function of elastic absorption of most of a mechanical energy of the mechanical resonator during a frontal impact of substantially radial direction between a flexible tooth 42 and a mechanical pallet of the anchor 14 which can occur when the escapement wheel stops rotating step by step and the mechanical movement stops operating normally.

Figure 3E:
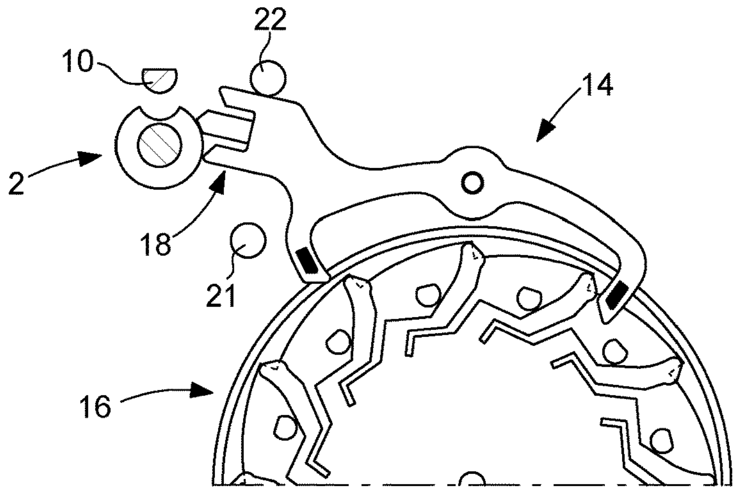
Figure 3F:
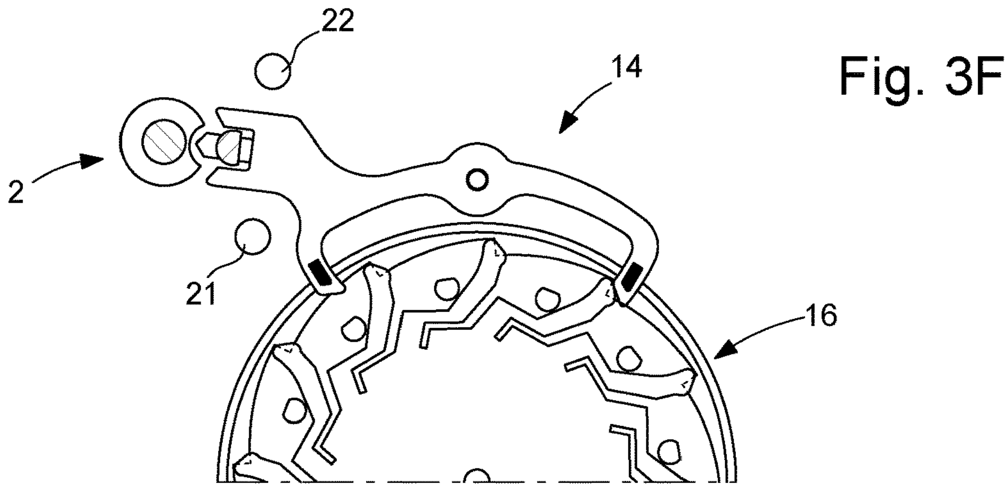

In the case of a frontal impact of a substantially radial direction between the mechanical pallet 29 and a flexible tooth 42 shown in FIGS. 3A to 3F, the mechanical resonator 2 undergoes a deceleration such that it ends up substantially stopping in the position shown in FIG. 3C, before a disengagement of the pin 10 from the fork 18. A possible evolution of the behaviour of the hybrid escapement and the mechanical resonator until a total stop of these mechanisms is given in FIGS. 3D to 3F. Once the mechanical resonator 2 has stopped, the flexible tooth elastically deformed by the mechanical pallet 29 returns the energy absorbed elastically to the mechanical resonator via the anchor which thus provides a certain force pulse to this resonator until the flexible tooth 42 abuts against the peg 44, this event being shown in FIG. 3D. The peg 44 plays an interesting role in this phase because it allows, once the frontal impact is over (the considered frontal impact in question lasts as long as the radial force, mentioned previously, which is exerted on the concerned flexible tooth is generated by the deceleration of the mechanical resonator), to dissipate part of the elastic energy absorbed during the frontal impact and thus reduce the amount of mechanical energy returned to the mechanical resonator, so as to rapidly dampen a residual oscillation until the mechanical resonator is completely stopped. FIG. 3E shows a snapshot with the mechanical resonator in an extreme angular position defining the amplitude of an alternation generated by the partial return of the elastic energy absorbed by the flexible tooth. It will be noted that it is possible for the escapement wheel to undergo a slight rotation, in particular a forward rotation, during the frontal impact and also during the return of the tooth in the direction of the retaining peg 44. FIG. 3F shows a final probable position for the mechanical resonator and the escapement when stopped, with a mechanical pallet bearing against an inclined surface of one of the flexible teeth.

In an advantageous variant, the flexible teeth 42 are arranged to bear against the retaining pegs 44 with a pre-stress, that is to say with a certain initial elastic deformation which is generated by the retaining pegs on the respective teeth in the absence of other forces. Such a prestress allows to increase the elastic absorption capacity of the flexible teeth over a given displacement distance from an initial position, abutting against the respective pegs, and a final position where these teeth abut on a base 43 of a tooth downstream of and/or on the periphery of the plate 40 which supports the flexible teeth at its periphery, as in the variant shown in the figures.

The invention claimed is:

1. A horological movement comprising:

a mechanical resonator; and an escapement which is associated with said mechanical resonator and which comprises an escapement wheel, having a plurality of projecting parts, and a stopper, said stopper comprising two mechanical pallets, respectively forming two mechanical abutments for the plurality of projecting parts, and a fork arranged to cooperate with the mechanical resonator via a periodic engagement of a pin, integral with said mechanical resonator, between two horns of the fork, the mechanical resonator being coupled to the stopper so that, during normal operation of the horological movement, the stopper undergoes a reciprocating movement between first and second rest positions wherein said stopper alternately remains during successive time atervals;

wherein the escapement is arranged so as to allow, during normal operation of the horological movement, absorption of kinetic energy of the escapement wheel by successive impacts, between the plurality of projecting parts and alternately the two mechanical pallets, respectively at an end of successive steps of a step-by-step rotation of the escapement wheel;

wherein the escapement is arranged so that, when the stopper is switched from the first rest position to the second rest position while the escapement wheel has any angular position in a plurality of ranges of angular positions corresponding respectively to the plurality of projecting part, one of the two mechanical pallets abuts against one of the projecting parts corresponding to the concerned range of angular positions before the stopper can reach an angular position of disengagement of the pin on a side of the second rest position, said one of the tyro mechanical pallets then exerting on said projecting part a radial force, relative to an axis of rotation of the escapement wheel, an intensity of which depends on said any angular position of the escapement wheel;

wherein the projecting parts of the escapement wheel are flexible and each is arranged so as to be able to bend, in a general plane perpendicular to an axis of rotation of the stopper, undergoing an elastic deformation under the action of said radial force, each projecting part having an elastic capacity allowing it the projecting part to elastically absorb, during said elastic deformation under the action of the radial force, most of a maximum mechanical energy that the mechanical resonator can have during normal operation of the horological movement; and wherein the escapement comprises a magnetic system magnetically coupling the escapement wheel and the stopper, the magnetic system including a magnet supported at each of the two mechanical pallets, and a periodic magnetized structure arranged on a disk, the periodic magnetized structure being provided on the escapement wheel.

2. The horological movement according to claim 1, wherein a plurality of rigid parts, integral with the escapement wheel, are respectively arranged behind the plurality of flexible projecting parts, relative to a normal direction of the step-by-step rotation of the escapement wheel, so that each flexible projecting part is retained by the corresponding rigid part during an impact, among said successive impacts, which may occur between said projecting part and either one of the two mechanical pallets, to prevent or limit a recoil of said projecting part during said impact in a tangential direction, relative to said axis of rotation of the escapement wheel, and allow dissipation of a portion of a kinetic energy that the escapement wheel has at the beginning of said impact.

3. The horological movement according to claim 1, wherein the escapement or a mechanism for driving the escapement wheel is arranged so that, in normal operation of the horological moveinent, the escapement wheel supplies pulses to the stopper for sustaining an oscillation of the mechanical resonator, the sustaining pulses having a constant energy as long as the horological movement is operating normally.

4. The horological movement according to claim 3, wherein said magnetic system is arranged so as to generate, during normal operation of the horological movement, magnetic pulses which form said constant energy sustaining pulses.

5. The horological movement according to claim 4, wherein said magnetic pulses are generated at the two mechanical pallets supporting the magnets forming two magnetic pallets; and wherein the stopper is arranged so as to be able, during normal operation of the horological movement, to substantially transmit a torque of magnetic fbrce generated by each of the magnetic pulses to the fork in order to sustain an oscillation of the mechanical resonator.

6. The horological movement according to claim 4, wherein the projecting parts are arranged so as to allow a self-starting of the assembly formed of the mechanical resonator and the escapement when the barrel spring is reset, following a stop of the horological movement, and the escapement wheel is again rotated.

7. The horological movement according to claim 4, wherein the the plurality of projecting parts are arranged in a general plane parallel to the disk and distant therefrom; and wherein the plurality of rigid parts are fixed to the disk and rise therefrom in the direction of said general plane.

8. The horological movement according to claim 7, wherein the plurality of rigid parts is formed of a plurality of pegs fixed to said disk.

9. The horological movement according to claim 4, wherein the projecting parts are formed by teeth arranged at a periphery of a plate forming the escapement wheel.

10. The horological movement according to claim 9, wherein, during said elastic deformation of any tooth of the plurality of teeth, bending of said tooth is limited by a corresponding abutment comprised in the escapement wheel.

11. The horological movement according to claim 1, wherein the stopper has an elastic capacity to elastically absorb, when said one of the two mechanical pallets abuts against a projecting part while the escapement wheel is positioned within said corresponding range of angular positions and the mechanical resonator is then braked by the stopper, part of a mechanical energy that the mechanical resonator has at a beginning of such an event, the anchor and the corresponding projecting part together haying an elastic capacity allowing the anchor and the corresponding projecting part to elastically absorb, during said event, a maximum mechanical energy that the mechanical resonator can have during normal operation of the horological movement.

12. The horological movement according to claim 4. wherein the stopper has an elastic capacity to elastically absorb, when said one of the two mechanical pallets abuts against a projecting part while the escapement wheel is positioned within said corresponding range of angular positions and the mechanical resonator is then braked by the stopper, part of a mechanical energy that the mechanical resonator has at the beginning of such an event, the anchor and the corresponding projecting part together having an elastic capacity allowing the anchor and the corresponding projecting part to elastically absorb, during said event, a maximum mechanical energy that the mechanical resonator can have during normal operation of the horological movement.

* * * * *